Nov. 22, 1960     M. S. MEAD     2,961,606
CAPACITOR TESTING DEVICE
Filed June 16, 1958
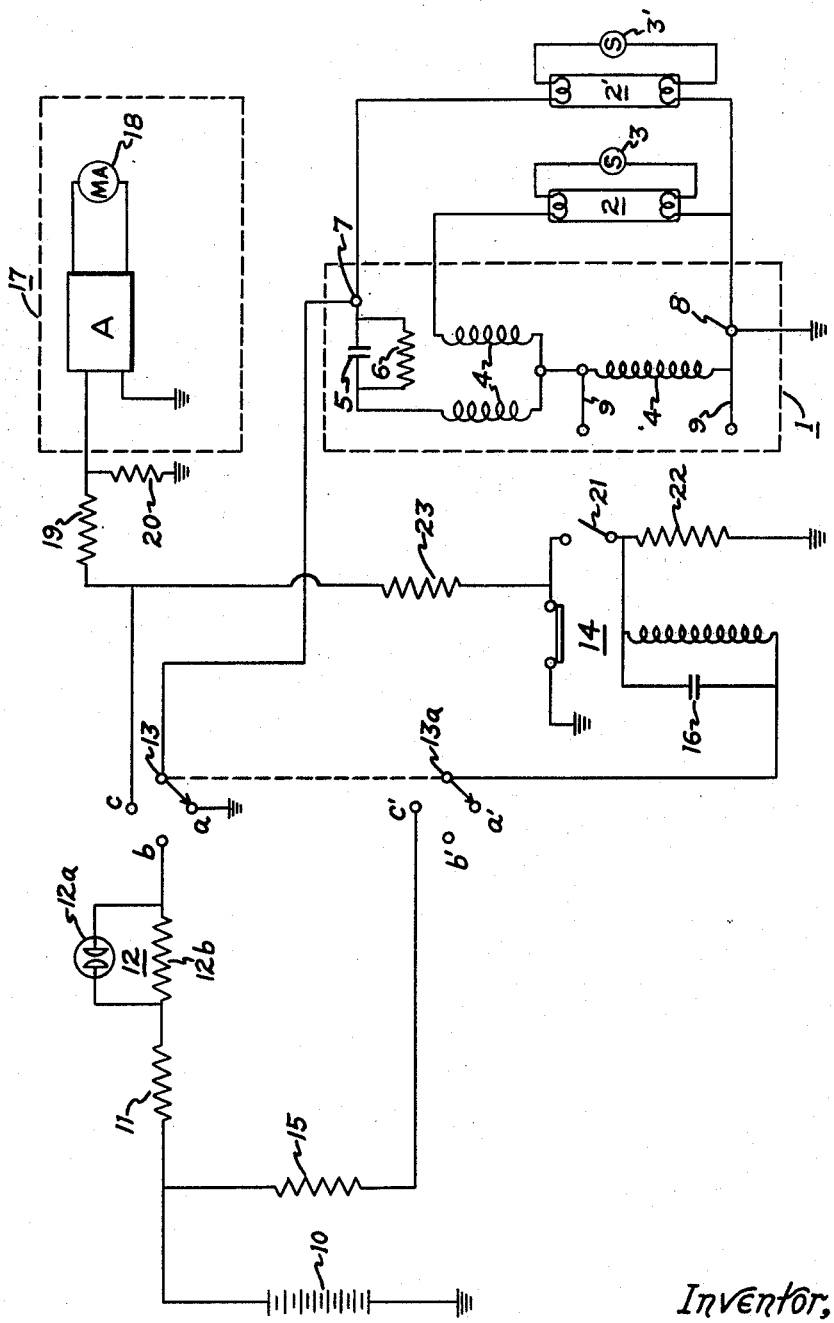
Inventor,
Milton S. Mead,
by Gilbert P. Tarleton
His Attorney.

United States Patent Office 2,961,606
Patented Nov. 22, 1960

2,961,606

CAPACITOR TESTING DEVICE

Milton S. Mead, Cleverdale, N.Y., assignor to General Electric Company, a corporation of New York Filed June 16, 1958, Ser. No. 742,153

4 Claims. (Cl. 324—60)

The present invention relates to testing of electrical capacitors, and more particularly to an apparatus adapted for measuring the dielectric absorption of capacitors incorporated in electrical circuits, as, for example, fluorescent lamp ballast circuits.

When ballast capacitors have been in operating service for a prolonged period, the electrical properties of the capacitor may begin to deteriorate and the capacitor ultimately fails. It is desirable to determine the condition of the capacitors in such circuits to avoid interruption of service and other adverse effects of capacitor failure, but it has not heretofore been found feasible to test the capacitors while incorporated in the ballast circuit. Power factor or dissipation factor measurements on the capacitor itself would determine the condition of the capacitor, but such measurements cannot as a practical matter be made with the capacitor installed in the usual fluorescent lamp ballast circuit, because the capacitor terminals are not readily available for such testing.

It is an object of the invention to provide a method and apparatus which may be of portable type for readily determining the condition of a capacitor in an electrical circuit, and particularly in a fluorescent lamp ballast.

To attain the above object, the invention provides in combination with a ballast circuit for electrical discharge devices of the type having an inductive reactance, a capacitor in series with the inductive reactance, a discharge resistor in shunt with the capacitor, and terminals, a device connected to the ballast terminals for testing and measuring the dielectric absorption of the capacitor which comprises means for charging the capacitor, means for discharging the capacitor, and means for measuring the maximum residual voltage and thereby the relative dielectric absorption of the capacitor.

The invention will be better understood from the following description taken in conjunction with the accompanying drawing, in which:

The single figure is a circuit diagram of the testing arrangement of the present invention.

Referring now to the figure, there is shown a known type of fluorescent lamp ballast circuit 1 for use with fluorescent lamps 2, 2' having starters 3, 3', ballast circuit 1 including induction coils 4, capacitor 5 with discharge resistor 6 in shunt therewith, terminals 7 and 8, and supply circuit 9. For determining the condition of ballast capacitor 5, the testing device of the present invention is connected as shown to terminals 7 and 8 of the ballast circuit which are brought outside the ballast case as leads.

The testing device circuit comprises a voltage source 10 which may be a small dry battery, of, say, 180 volts, current limiting resistor 11, and a short circuit detector 12 comprising a neon lamp 12a connected around a resistance 12b. A three-position, double-pole switch 13, 13a is arranged in the circuit for selective manual positioning respectively at terminals $a$, $b$, $c$, and $a'$, $b'$, $c'$. The arm of section 13 is connected to terminal 7 of the ballast circuit and the arm of section 13a is connected to relay 14, which is normally in closed position as shown. The operation of relay 14 is controlled, when switch arm 13a is moved to contact $c'$, by a time delay circuit which is connected to the power supply circuit and includes resistance 15, capacitor 16 and variable resistor 22. Connected to relay 14 and contact $c$ of switch 13 is an electrometer type D.C. voltmeter 17, which includes an amplifier A comprising an electrometer input stage, and a microammeter 18. An electrometer is a high impedance amplifier stage, which may be an electron tube device, and is particularly suited for use in devices for the measurement of minute currents. It is desirable to use for the purposes of the present testing device a voltmeter which draws very little current to avoid "loading" the circuit being measured, and the input resistance for the electrometer should at least 50 megohms.

Resistors 19 and 20 arranged at the input side of electrometer 17 serve as a voltage divider for obtaining the desired range of input voltages to the electrometer.

A calibrating circuit including switch 21 and resistor 22 is advantageously provided for connecting power source 10 to voltmeter 17 prior to the testing procedure in order to determine the condition of the power source.

The testing device thus described can be used to test ballast capacitors incorporated in ballasts with the capacitor in series with iron cored inductance and other ballast components and even with the capacitor terminals being inaccessible. I have discovered that the relative dielectric absorption of ballast capacitors can be effectively measured, in the manner hereinafter set forth, and that measurements are not adversely affected by the other ballast components connected to the capacitor. Briefly, the measurement is obtained, using the described device, by first charging the test capacitor from D.C. voltage source 10 through reactances 4 for a fixed period, then discharging it by a short circuit for a brief fixed period, and then noting the maximum residual voltage appearing between terminals 7 and 8 and hence the charge remaining in the capacitor. Following the discharge period, the charge absorbed in the capacitor dielectric causes a voltage, i.e., the residual voltage, to build up across the terminals of the capacitor. At the same time, the discharge resistor in parallel with the capacitor is acting to discharge the capacitor. At the instant that the current which is charging the capacitor equals the current in the discharge resistor, a maximum voltage is reached, and it thereafter decreases until eventually the capacitor is discharged.

The operation of the circuit described above and shown in the drawing is as follows. With the switch 13, 13a on position $a$, $a'$, the capacitor 5 to be tested is short circuited through reactances 4 and made ready for test. To begin the test, switch 13, 13a is moved to position $b$, $b'$ at time=0. Capacitor 5 is then charged to the full voltage of battery 10. Should capacitor 5 happen to be short circuited, neon lamp 12a will glow continuously. In the absence of a short circuit, switch 13, 13a is moved after a fixed time interval to position $c$, $c'$. A fixed time interval of about 5 seconds at position $b$, $b'$ for charging the test capacitor has been found particularly suitable, but other periods of charging time may be found useful in particular cases. It is desirable, however, that the same period be used to properly compare a number of like capacitors being tested.

At the instant switch 13, 13a is moved to position $c$, $c'$, relay 14 is closed and short circuits capacitor 5 through reactances 4. Switch arm 13a at this position closes the relay circuit, but the short circuit on the capacitor 5 is opened only after a time delay provided by capacitor 16 and resistor 15. During this time delay, which typically is of the order of ½ second, test capacitor 5 is discharged, As will be evident, timer means other than the particular time delay relay arrangement shown could be used if desired. As shown in the drawing, a resistor 23 may be arranged in the discharge circuit to prevent arcing at the switch contacts during the discharge cycle.

Following this short discharge period, which ends by the opening of relay 14, voltmeter 17 shows a reading which gradually increases from zero due to the build up of residual voltage in capacitor 5, and in a few seconds passes through a maximum value, and then drops gradually due to the presence of the discharge resistor 6. The maximum value is read, and is taken as an indication of the condition of the capacitor 5. The lower this peak reading, the better is the capacitor.

Tests made on a large number of like ballast capacitors, e.g., 1 to 5 microfarad capacitors, using the above procedure showed excellent correlation between the values of maximum readings on the electrometer and the 60 cycle power factor measurements at 65° C. made independently on these capacitors.

A readily operable and portable device of this invention thus provides a simple and convenient means for quickly checking the condition of capacitors operatively installed in fluorescent ballasts and in other circuits where the capacitor terminals themselves are not easily accessible for testing purposes.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. In combination with a ballast circuit for electrical discharge devices having an inductive reactance and a capacitor connected in series circuit relationship between a pair of terminals, and a discharge resistor connected in shunt with the capacitor, a device connected to said terminals for testing the dielectric absorption of the capacitor which comprises means for charging the capacitor, means for discharging the capacitor, and means for indicating the maximum residual voltage and thereby the relative dielectric absorption of the capacitor.

2. In combination with a ballast circuit for electrical discharge devices having an inductive reactance and a capacitor connected in series circuit relationship between a pair of terminals, and a discharge resistor connected in shunt with the capacitor, a device connected to said terminals for testing the dielectric absorption of the capacitor which comprises means comprising a portable battery for charging the capacitor, means including time delay means for discharging the capacitor for a predetermined period, and means for indicating the maximum residual voltage and thereby the relative dielectric absorption of the capacitor.

3. In combination with a ballast circuit for electrical discharge devices having an inductive reactance, a capacitor, a discharge resistor in shunt with the capacitor, and terminals, a device connected to said terminals for testing the dielectrical absorption of the capacitor which comprises means comprising a portable battery for charging the capacitor, means including time delay relay means for discharging the capacitor for a predetermined period, and means including an electrometer type voltmeter for indicating the maximum residual voltage and thereby the relative dielectric absorption of the capacitor.

4. In combination with a ballast circuit for electrical discharge devices having an inductive reactance and a capacitor connected in series circuit relationship between a pair of terminals, and a discharge resistor connected in shunt with the capacitor, a device connected to said terminals for testing the dielectric absorption of the capacitor which comprises a portable source of potential, circuit means including time delay means and double-pole, three-position selector switch means, said circuit means being operable with said switch means at its first position for discharging the capacitor, at its second position for charging the capacitor, and at its third position for discharging the capacitor for a predetermined period, and voltmeter means including a high impedance amplifier and indicating means for indicating the maximum residual voltage and thereby the relative dielectric absorption of the capacitor.

References Cited in the file of this patent

UNITED STATES PATENTS

| | | |
|---|---|---|
| 1,652,538 | Marbury | Dec. 13, 1927 |
| 2,243,755 | James | May 27, 1941 |
| 2,791,750 | Menzel et al. | May 7, 1957 |